Feb. 19, 1924.

F. L. BIXBY ET AL

NUT LOCK

Filed Oct. 5, 1922

1,483,924

WITNESSES

INVENTORS
F. L. Bixby, T. R. Gibson,
E. W. Cheney,
BY

ATTORNEYS

Patented Feb. 19, 1924.

1,483,924

UNITED STATES PATENT OFFICE.

FREDERICK L. BIXBY, THOMAS R. GIBSON, AND EVERETT W. CHENEY, OF RENO, NEVADA.

NUT LOCK.

Application filed October 5, 1922. Serial No. 592,625.

*To all whom it may concern:*

Be it known that we, FREDERICK L. BIXBY, THOMAS R. GIBSON, and EVERETT W. CHENEY, citizens of the United States, and residents of Reno, in the County of Washoe and State of Nevada, have invented certain new and useful Improvements in Nut Locks, of which the following is a specification.

Our invention relates generally to devices for holding a nut releasably locked to a bolt so that the nut is held against accidental displacement from adjusted relation to the bolt but can be moved therefrom at will.

An object of our invention is to provide a device of the character described which affords facilities for releasably locking a nut in a set position upon a bolt and in addition serves to protect the associated portion of the bolt from dust, water, mud or other matter.

A still further object of the invention is to provide a nut of the character described which is adapted for use in attaining the objects set forth in the foregoing and in addition is adapted to hold a lubricant in position to be fed to the relatively moving parts of the associated nut and bolt, thereby tending to obviate corrosion of the nut and bolt and particularly of the threads thereof, or the "freezing" of the nut to the bolt.

A still further object of our invention is to provide a device of the character described which is adapted to be readily applied to a nut and bolt arrangement and to be removed with equal facility from its applied position when desired.

Other objects and advantages will be apparent from the following description, and the novel features of the invention will be particularly outlined in the appended claims.

Our invention is illustrated in the accompanying drawings, forming a part of this application, in which—

Figure 1:
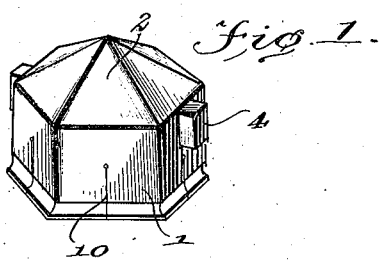
Figure 1 is a perspective view of one form of cap embodying our invention.
Figure 3:
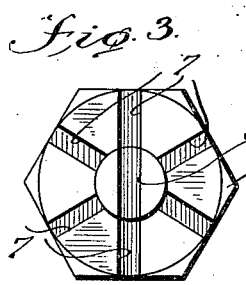
Figure 2:
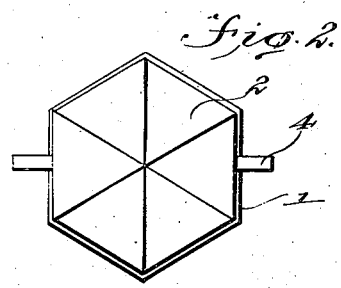
Figure 2 is a top plan view of the cap shown in Figure 1.
Figure 4:
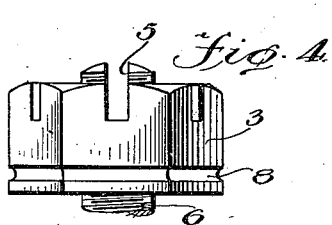
Figure 5:
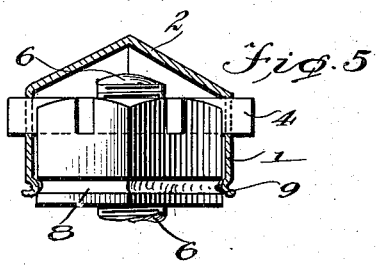
Figure 6:
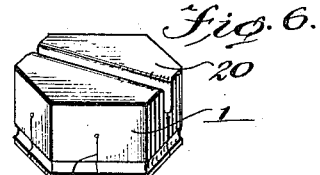
Figure 8:
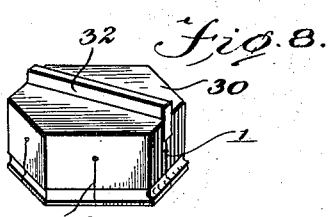
Figure 7:
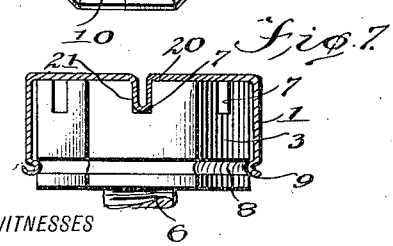
Figure 9:
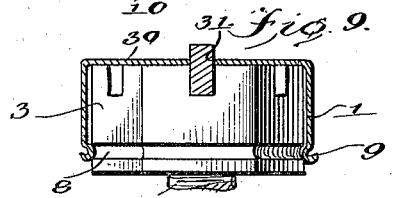

Figures 3 and 4 respectively are a plan view and a side elevation of a bolt and nut arrangement adapted to be equipped with our invention, Figure 5 is a view, partly in vertical section and partly in side elevation, showing the cap exhibited in Figures 1 and 2 in applied position with respect to the bolt and nut arrangement shown in Figures 3 and 4, Figure 6 is a perspective view of another form of cap embodying our invention, Figure 7 is a view similar to Fig. 5, showing the cap exhibited in Figure 6 in applied position, Figure 8 is a perspective view of still another form of cap embodying our invention, and Figure 9 is a view similar to Figures 5 and 7, showing the third form of cap operatively applied.

Referring now to the accompanying drawings and particularly to Figures 1, 2 and 5 thereof, it will be observed that one form of cap embodying our invention comprises a continuous skirt or body portion 1 merged at its one end into a top or head 2, which is shown as substantially pyramidal in form. The inner wall of the skirt or body portion 1 conforms in cross sectional contour to that of a nut 3 and may have any suitable configuration, being hexagonal in the embodiment of the invention illustrated. The body of the cap is preferably made of a light gauge metal and in consequence the contour of the outer walls of the body usually, although not necessarily, conforms to the contour of the inner walls thereof.

Extending through the walls of the body or skirt 1 and being secured thereto in any suitable known manner is a diametrically disposed locking bar 4. The locking bar 4 is positioned diametrically of the body portion of the cap and extends across the latter at the upper end thereof and is adapted to enter a diametrically disposed slit or groove 5 in the end of a bolt 6 when the cap is slipped over the end of the bolt. Upon further movement of the cap with respect to the bolt 6, the locking bar 4 will enter and engage at the ends of the groove or slit 5 grooves 7 extending radially in the upper face of the nut 3, which is in threaded engagement with the bolt.

The nut 3 is of the usual castellated construction and may be turned on the bolt so that any selected pair of grooves 7 will extend from the opposite ends of the groove 5 in alignment therewith. As stated, the body portion 1 of the cap is adapted to fit the nut 3 when slid upon the latter so that the cap and the nut may be turned only as a unit and the nut is held against rotation independently of the cap. When the cap has been slid upon the nut 3 a distance sufficient to cause engagement of the locking bar 4 with the aligned grooves 7, 5, 7, it will be apparent that the cap and the nut 3 will be held against movement about the axis of the bolt 6.

The nut 3 is provided adjacent its lower end with a peripheral groove 8 which is adapted to be engaged by an inwardly extending portion 9 of the body of the cap when the latter has been slidably moved to a certain position in respect to the nut 3 so that accidental displacement of the cap from such position on the nut 3 is prevented. It will be understood that instead of the cooperating inwardly extending continuous portion 9 and the peripheral groove 8, we may provide cooperating depressions or indentations and protuberances or projections of various known forms on the contiguous portions of the nut 3 and the body portion 1 of the cap for releasably holding the cap against movement on the nut from a determined position, without departing from the spirit and scope of our invention.

In order to facilitate the application of the cap to the nut or removal thereof from the nut as desired, and to insure effective cooperation between the groove or depression 8 in the nut and the inwardly extending projection 9 on the cap, a plurality of slits 10 are provided in the body 1 to extend longitudinally thereof for an appreciable distance from the free end thereof. As a result, a spring action is obtained, the body 1 being expanded slightly at its lower end when slipped upon the nut 3. When the inwardly extending portion or projection enters the groove or depression, the walls of the slits will be moved toward each other and the cap will clampingly engage the nut.

From the foregoing description of the various parts of the device, the operation thereof may be readily understood. In applied position the cap will be releasably locked to the nut and both the nut and the cap will be held against turning on the bolt and therefore will be held against accidental displacement from the bolt. The cap completely encases the ordinarily exposed threads of the bolt end and nut. A lubricant may be placed between the inner walls of the cap and the adjacent portions of the nut and bolt so that the cooperating parts of the nut and bolt will be maintained in a lubricated condition and thus "freezing" of the nut to the bolt because of rusting is obviated. Moreover, the cap protects the bolt end and the nut from dust, sleet, snow or water, and injury because of the impact of accidental blows from flying objects.

In the form of the device illustrated in Figs. 6 and 7, the body or the skirt portion 1 is integral with a top or head portion 20 which is substantially flat and the body and top or head portion are fashioned to provide a depending portion 21 extending diametrically of the top or head portion and being substantially U-shaped in cross section. The depending portion 21 is adapted to enter and engage with aligned grooves 7, 5, 7 of the bolt and nut heretofore described to lock the nut to the bolt. The remaining parts of the form of the cap illustrated in Figs. 6 and 7 are identical in essential respects with corresponding parts of the form of the cap exhibited in Figs. 1, 2 and 5 and in consequence require no further description. The same reference characters have been used to denote like parts throughout the several views of the drawings.

The operation of the second form of the invention likewise is identical in essential respects with the operation of the first form of the device, the integral depending diametrical portion 21 serving as a locking lug or bar suitable for use in performing the functions of the locking bar or lug 4.

The cap illustrated in Figures 8 and 9 includes a substantially flat top or head portion 30 integral with th body 1. A diametrically extending slot 31 formed in the top or head 30 extends into the adjacent end of the body 1 at diametrically opposite points and is adapted to receive a locking bar 32 which may be secured in the slot 31 in any suitable known manner so that a longitudinal portion of the locking bar depends within the cap and is adapted to enter the aligned grooves 7, 5, 7 of the bolt and nut arrangement 6 and 3. The form of the cap shown in Figures 8 and 9 is otherwise identical in essential respects with the forms of the device hereinbefore described.

Obviously, our invention is susceptible of embodiment in forms other than those illustrated in the accompanying drawings, and we therefore consider as our own all modifications of the forms of the device herein disclosed, which fairly fall within the scope of the appended claims.

Having thus described the invention, what we claim is:—

1. The combination with a bolt having a diametrical groove in the end thereof and a castellated nut adjustably mounted upon the end portion of the bolt, a cap having a body adapted to fit over the nut, a locking member extending diametrically of the body of the cap in position to engage with aligned grooves of the nut and bolt to releasably hold the nut against turning on the bolt, said nut having a continuous depression in the peripheral walls thereof and said body portion having a continuous inwardly extending portion adapted to engage with said depression when the cap is in a certain position on the nut to releasably hold the cap against displacement from the nut and to prevent escape of a lubricant from the space between said cap and said nut.

2. The combination with a bolt having a diametrical groove in the end thereof and a castellated nut adjustably mounted upon the end portion of the bolt, a cap having a body adapted to fit over the nut, a locking member extending diametrically of the body of the cap in position to engage with aligned grooves of the nut and bolt to releasably hold the nut against turning on the bolt, said nut having a continuous depression in the peripheral walls thereof and said body portion having an inwardly extending peripheral portion adapted to engage with said depression when the cap is in a certain position on the nut to releasably hold the cap against displacement from the nut, said cap having means extending in the body portion longitudinally thereof from the free end of the latter to permit expansion of the free end portion of the body when the cap is being slid on said nut toward said position thereon.

FREDERICK L. BIXBY.
THOMAS R. GIBSON.
EVERETT W. CHENEY.